Oct. 25, 1960 G. H. CHENEY 2,957,345
APPARATUS FOR RECORDING WIND TUNNEL TEST PRESSURES
Filed Oct. 8, 1956
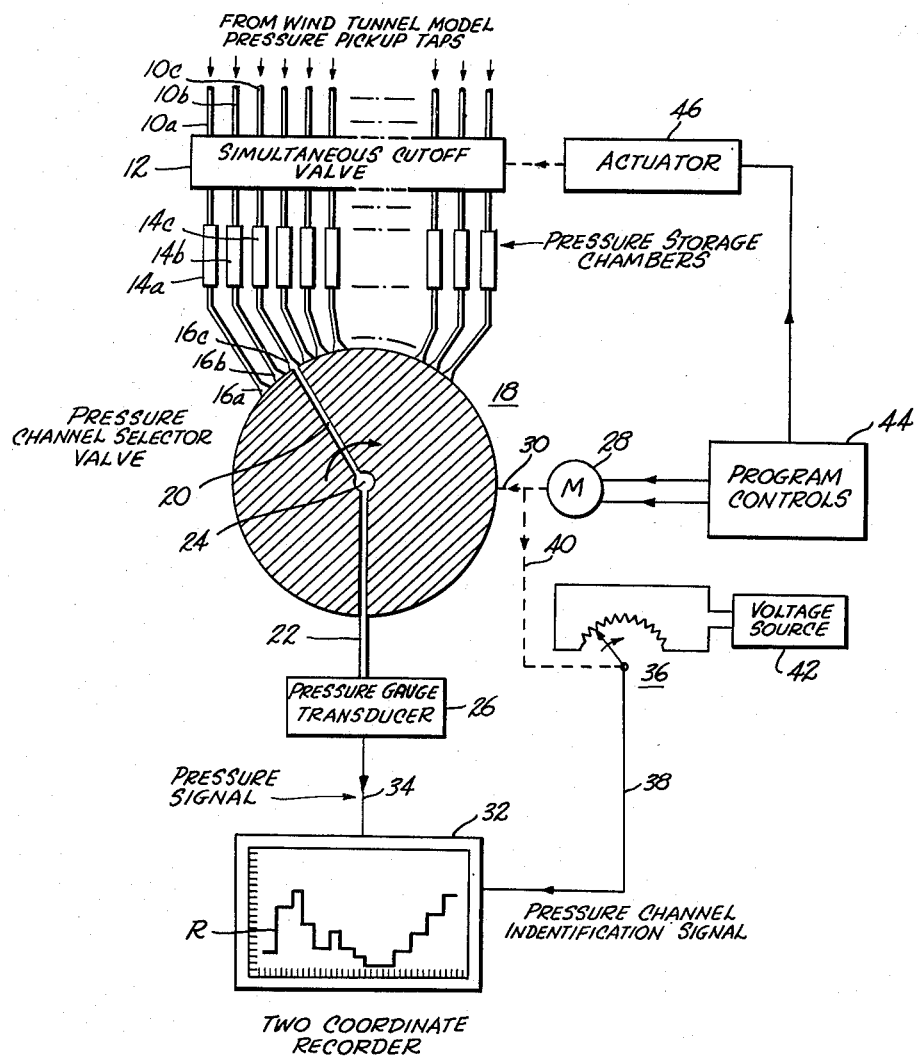
INVENTOR.
GORDON H. CHENEY
BY
ATTORNEYS United States Patent Office 2,957,345
Patented Oct. 25, 1960

2,957,345

APPARATUS FOR RECORDING WIND TUNNEL TEST PRESSURES

Gordon H. Cheney, Seattle, Wash., assignor to Boeing Airplane Company, Seattle, Wash., a corporation of Delaware Filed Oct. 8, 1956, Ser. No. 614,660

5 Claims. (Cl. 73—147)

This invention relates to apparatus operable to record a plurality of gas pressures as of a given instant of time, and is herein illustratively described by reference to the presently preferred form thereof as applied to the recording of model test pressures in supersonic wind tunnels of the type capable of sustaining test velocities only for short time periods. However, it will become evident that the invention has other applications as well and that certain modifications and changes therein may be made without departing from the essential features involved.

In making wind tunnel tests of aircraft models and the like, it is essential in most cases to obtain readings or graphical records of the pressures existing at a number of different points on or around the model at the same instant of time. This is true because of the problem of maintaining identical test conditions over a long time period during which the different pressures may be successively measured or recorded. The problem of measuring or recording a plurality of test pressures as of a given instant becomes particularly essential in the case of certain supersonic wind tunnels in which the "blow down" period during which the desired supersonic flow is maintained lasts only in the order of a few seconds, and even during those few seconds conditions may not remain precisely constant. In some instances it may be desired to make a succession of tests during a single "blow down."

An object of the present invention is to provide practical and efficient apparatus for measuring or recording a plurality of test pressures as they exist at a given instant of time and to record those pressures quickly thereafter, to enable a succeeding set of measurements to be made.

More specifically, it is an object to provide such apparatus which is reliable, simple in form and relatively inexpensive, and which permits using only a single measuring or recording device in conjunction with a plurality of pressure pick-up taps. A related object is to enable such recordings or measurements to be made with conventional measuring or recording devices operating at their normal rates, that is, over a period of time which may be long in relation to the duration of the brief instant at which the test pressures being determined exist, or which may be short in relation to an available period of time in which a plurality of tests are to be made.

As a result, accurate recordings unaffected by transients and usable directly for interpretative analysis are obtained conveniently despite the shortness of the interval during which the test pressures are sampled for measurement.

Another advantage of the invention is that the test set up in the wind tunnel may be prepared for a succeeding test during the time while the recordings or measurements from the preceeding test are being completed and reduced to usable form by the recording portion of the test apparatus, thereby enabling a maximum number of tests to be made with a busy wind tunnel within a limited period of time.

In accordance with the invention as herein disclosed, a plurality of test pressure pick-up taps and associated lead-off conduits, such as may be mounted on a wind tunnel test model, for example, are combined with recording or measuring means operable to respond to the test pressures, a plurality of pressure storage elements connected to, or forming a part of, or interposed in the respective tap conduits, means operable to close such conduits simultaneously at a given instant of time in order to trap and store in said storage elements the test pressures existing at the model at the precise instant of such closure, and selector valve means of the successive scanning type arranged to apply the stored pressures individually and in successive order to the recording or measuring means after closure of the conduit cut-off means to produce separate recordings or measurements for each of the individual pressures.

These and other features, objects, and advantages of the invention will become more fully evident from the following description thereof by reference to the accompanying drawing constituting a schematic diagram of the invention in its preferred form and application.

In the drawing the test pressures being determined as of a given instant of time are recorded graphically. It will be recognized, however, that digital type recording, such as may be made with the use of IBM punch cards or the like, may be used in lieu thereof and that in certain cases still other means of measurement or recording may be employed. In other words, the invention is not limited to a specific type of recording device.

For reasons of convenience and for emphasis upon the novel features only, the drawing omits any showing of the wind tunnel as such and of the test model and pressure taps mounted thereon or at other locations for deriving the test pressures to be measured. However, the lead-off conduits 10a, 10b, 10c, etc. extending from the pick-up taps are illustrated. These pass through the normally open ports (not shown) of the simultaneous cut-off valve 12, which may be of any suitable type adapted for operation to close all of its ports substantially simultaneously by a mechanical, electrical or fluid operated actuator. From the cut-off valve the conduits extend respectively to a plurality of pressure storage chambers 14a, 14b, 14c, etc. These storage chambers represent elements having adequate volumetric storage capacity to actuate the measuring or recording means in accordance with operation of the disclosed apparatus, and may include separate chambers as shown or merely lengths of the connecting conduits, or both, and are intended to be defined as such herein. From the pressure storage chambers the conduits extend to the respective inlets 16a, 16b, 16c, etc., of a selector valve 18 of the scanning type labeled "pressure channel selector valve" in the drawing. The valve 18, illustrated as a rotary type, may assume any of different forms. As shown, this valve has a single outlet comprising switching port or passage 20 extending through its rotor from the periphery thereof proximate to the inlets 16a, 16b, 16c, etc., arranged therearound. The passage 20 extends inwardly of the rotor to a suitable rotary duct connection 24 communicating with an outlet conduit 22. The conduit 22 extends to a pressure gauge transducer 26 capable of producing an electrical signal proportional to the pressure delivered by the conduit 22 to the transducer. The latter is preferably of the flush diaphragm, strain gauge type, having a very small volumetric capacity occupied by gas introduced into the same through the conduit 22. Also, the internal passages through the valve 18 and the internal passage of the conduit 22 are made as small in volume as practically possible. The purpose of small volumetric capacities in the elements subjected to pressures in the storage chambers for and during the measurement or recording operation will become evident.

The valve 18 is operated by rotation of its rotor incorporating the passage 20, such rotation being effected by a motor 28 acting through a suitable mechanical connection 30, which preferably includes speed reduction gearing. The driven speed of the rotor is such that the inlet ports 16a, 16b, 16c, etc., are scanned by the outlet passage 20 successively at a predetermined rate which corresponds to a convenient rate, preferably the optimum-maximum rate of operation of the recording device 32.

The recording device 32 is illustrated as being of the two-coordinate type operated by two electrical signals, one being the output signal from the transducer 26 applied to the recorder through the connection 34, and the other being the output voltage signal from the potentiometer 36 applied to the recorder through the connection 38. The variable wiper of the potentiometer is driven at a rate which corresponds to the rate of rotation of the motor of valve 18 and is mechanically connected through the coupling 40 to the motor 28. The winding of potentiometer 36 is energized from a suitable stable voltage source 42. It will be recognized that the details of the recording means may vary and that different types of recorders or measuring means may be employed in the practice of the invention in its broader aspects.

As the valve rotor sweeps successively past the inlet ports 16a, 16b, 16c, etc., the existing pressures in these ports are communicated through the passage 20 and the conduit 22 to the pressure gauge transducer 26 in order to produce successive electrical signals which are respectively proportional to such pressures for application to the recorder 32. These are represented by the successive plateau sections of the trace line forming the graphical record R illustrated on recorder 32 in the drawing. The rate of drawing the graph trace horizontally on the record sheet is, of course, determined by the rate of scan of potentiometer 36, and in the example is a uniform rate.

Starting and stopping of the motor 28 at the beginning and ending of the scan period, and operation of the simultaneous cut-off valve 12 are both preferably under control of suitable timing apparatus which may be automatic in its operation or which may be operated manually or under manual control. For purposes of illustration such timing control apparatus is represented by the block designated "program controls" 44 in the drawing, connected to energize the cut-off valve actuator 46 as well as to energize the motor 28. The arrangements are such that the actuator 46 is operated to close the cut-off valve before the motor 28 operates to sweep the scanning outlet passage 20 of the valve 18 successively past the inlet ports 16a, 16b, 16c, etc. The cut-off valve 12 is maintained closed during the entire scanning operation by selector valve 18.

During a test or wind tunnel "blow down" tap pressures quickly equalize in the storage chambers. Quick equalization is achieved by having relatively low-volume storage chambers and connecting conduits extending from the pressure pick-up taps. When, during the test cycle, the desired instant for pressure measurement is reached, the program controls 44 operate, preferably automatically, to energize the valve actuator 46 to cut off the pressure storage chambers 14a, 14b, 14c, etc. from the pick-up taps. At this instant, the rotor of valve 18 is maintained in a position relative to the inlet ports 16a, 16b, 16c, etc. to seal off these ports. Thus, air at the different test pressures is trapped in the pressure storage chambers and immediately adjoining sections of the conduits 10a, 10b, 10c, etc. Subsequently, and at the convenience of the operator or otherwise, the program controls, while maintaining valve 12 closed, energize motor 28 to rotate the selector valve rotor and to initiate scan of the recording element in the recorder 32. When the scanning passage 30 comes into registry with the first inlet port 16a, the pressure in the corresponding pressure storage chamber 14a is immediately communicated to the pressure gauge transducer 26 and registers on the recorder as a trace line offset from the pressure ordinate axis by an amount corresponding to the pressure in the pressure storage chamber 14a. The same occurs with respect to the pressures existing in the storage chambers 14b, 14c, etc., as the moving valve passage 20 comes successively into registry with the corresponding inlet ports 16b, 16c, etc. so that each such pressure is successively recorded in similar manner. A low volumetric capacity of valve 18 and transducer 26 relative to the storage chamber capacity insures negligible change in any test pressure being recorded, during the actual recording thereof.

It will be observed that these recorded pressures are identically the pressures which existed at the respective pressure pick-up taps in the test setup at the instant of closure of the cut-off valve 12. Accuracy of the instrument is, of course, dependent on effecting a complete seal of the pressure storage chambers from the pick-up taps and from the atmosphere in order to hold the trapped air for as long as may be required to effect completion of the recording operation. With proper design readily achieved in practice, the storage chamber pressures may be held for a relatively long period permitting the recorder to be operated at a convenient rate so as to obtain an accurate, clear and usable graphic record with conventional recording equipment. Thus the wind tunnel "blow down" or test may last for only a few seconds and yet the pressure recording or measuring operation may consume a minute or longer.

As previously mentioned, measuring or recording the trapped air pressures subsequently to the actual time of the test has the further advantage that, because of the continued closure of cut-off valve 12, the wind tunnel test setup may undergo rearrangement for the next test during the time the recording of pressures from the preceding test is taking place.

These and other aspects and advantages of the invention and its applications in other test arrangements will be evident to those skilled in the art on the basis of the foregoing description and accompanying illustration.

I claim as my invention:

1. Wind tunnel test pressures recording apparatus comprising, in combination with a plurality of pressure taps and associated conduits extending therefrom, a plurality of pressure storage chamber elements respectively connected to said conduits to receive and store air under pressures corresponding to the test pressures at said taps, respectively, cut-off means interposed in said conduits and operable at a given instant to close the same simultaneously against airflow to or from said storage chamber elements, and means connected to said storage chamber elements and operable upon operation of said cut-off means to record rapidly the pressures thus stored in said storage chamber elements, said latter means including a recording device, transducer means adapted to operate said recording device in accordance with such pressures, and selector valve means having a plurality of inlets respectively connected to said storage chamber elements and an outlet connected to said transducer means and movable into communication with such inlets successively and individually for connecting said storage chamber elements successively to said transducer means after operation of said cut-off means, thereby to record said stored pressures.

2. Wind tunnel test pressures measuring apparatus comprising, in combination with a plurality of pressure taps and associated conduits extending therefrom, a plurality of pressure storage chamber elements respectively connected to said conduits to receive and store air under pressures corresponding to the test pressures at said taps, respectively, cut-off means interposed in said conduits and operable at a given instant to close the same simultaneously against airflow to or from said storage chamber elements, and means connected to said storage chamber elements and operable upon operation of said cut-off means to sense the pressures thus stored in said storage chamber elements, said latter means including transducer means responsive to such pressures and selector valve means having a plurality of inlets respectively connected to said storage chamber elements and an outlet connected to said transducer means and movable into communication with such inlets successively and individually for connecting said storage chamber elements successively to said transducer means after operation of said cut-off means.

3. In combination a plurality of gas pressure pick-up taps and conduits extending individually therefrom, a plurality of pressure storage chamber elements respectively connected to said conduits to receive and store gas under pressures corresponding to the gas pressures at said taps, respectively, cut-off means interposed in said conduits and operable at a given instant to close the same simultaneously against airflow to or from said storage chamber elements, transducer means connected to said elements and responsive to such pressures, selector valve means having a plurality of inlets respectively connected to said storage chamber elements and an outlet connected to said transducer means and movable into communication with such inlets successively and individually for connecting said storage chamber elements successively to said transducer means, and control means operating said cut-off means and thereafter automatically operating said selector valve means, said cut-off means maintaining said conduits closed during said movement of said valve outlet.

4. Wind tunnel test pressures recording apparatus comprising, in combination with a plurality of pressure taps and associated conduits extending therefrom, a plurality of pressure storage chamber elements respectively connected to said conduits to receive and store air under pressures corresponding to the test pressures at said taps, respectively, cut-off means interposed in said conduits and operable at a given instant to close the same simultaneously against airflow to or from said storage chamber elements, and means to record the pressures thus stored in said storage chamber elements including a recording device having two inputs for operating the same in two coordinates, transducer means connected to one such input and adapted to operate said recording device in one ordinate in accordance with such pressures, selector valve means having a plurality of inlets respectively connected to said storage chamber elements and an outlet connected to said transducer means and movable into communication with such inlets successively and individually for connecting said storage chamber elements successively to said transducer means after operation of said cut-off means, and control means connected to said selector valve means and connected to the other recording device input, said control means being adapted for operating said recording device in its other ordinate in accordance with the successively changing position of said selector valve means, thereby to produce separate and successively arranged pressure recordings.

5. The apparatus defined in claim 4, wherein the valve outlet is moved at a substantially uniform rate, and the control means comprises a potentiometer having an energized winding and a variable tap relatively movable with said valve outlet, said variable tap being connected to said other recording device input for producing a progressive line trace made up of line sections respectively representing the pressures to be recorded.

References Cited in the file of this patent

UNITED STATES PATENTS

| | | |
|---|---|---|
| 1,405,177 | Zahm | Jan. 31, 1922 |
| 2,423,340 | Pellettere | July 1, 1947 |
| 2,516,217 | Keinath | July 25, 1950 |
| 2,551,526 | Campbell | May 1, 1951 |
| 2,813,421 | Cheney et al. | Nov. 19, 1957 |
| 2,814,198 | Howland | Nov. 26, 1957 |